INVENTOR.
Henry A. Rahmel
BY
Attorney

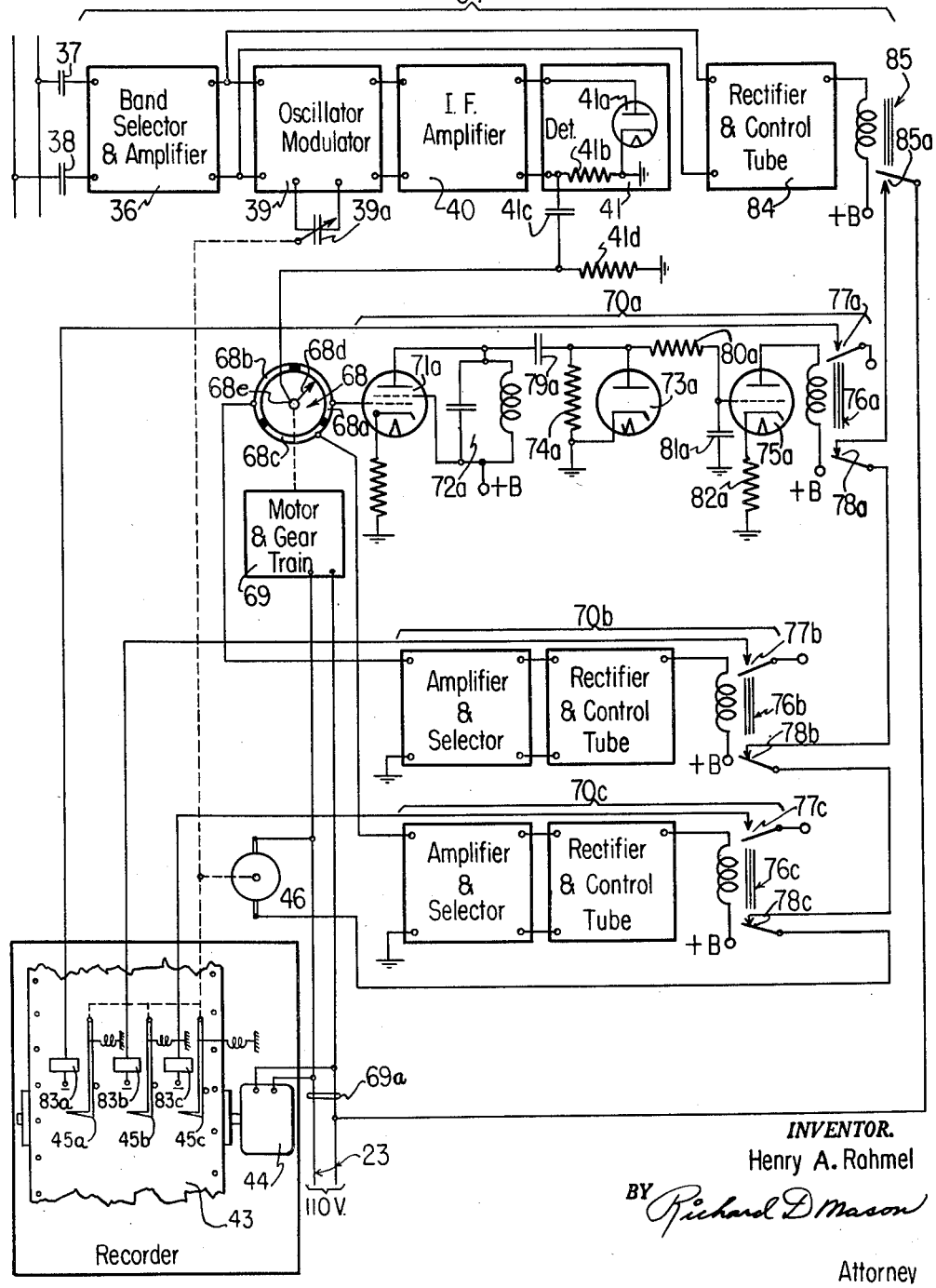

Patented Mar. 3, 1953

2,630,367

UNITED STATES PATENT OFFICE 2,630,367

SYSTEM AND APPARATUS FOR DETERMIN-
ING THE LISTENING HABITS OF WAVE
SIGNAL RECEIVER USERS

Henry A. Rahmel, Evanston, Ill., assignor to A. C.
Nielsen Company, Chicago, Ill., a corporation
of Illinois Application January 31, 1947, Serial No. 725,480

17 Claims. (Cl. 346—37)

1

The present invention relates to systems and apparatus for determining the listening habits of users of wave signal receivers of the broadcast type and more particularly to improvements in systems and apparatus for determining the audience popularity or rating of different programs transmitted from one or more wave signal transmitters and for gathering other information of great importance in determining the effectiveness of radio advertising.

Instrumented methods of determining the listening habits of broadcast receiver users generally involve the use of a recording device operating in conjunction with each collaborator receiver used in the sampling system, to record, as a function of time, the transmitters to which the receiver is tuned for program reception. In general, two different types of recording device have been used to produce a record of the extent of receiver use and the particular transmitters to which the receiver is tuned for program reception during a predetermined calender period. The first, or all mechanical type of device, employs a mechanical connection between the tuning shaft of the ganged condensers of a receiver and the recording stylus of the recorder to move the stylus transversely of a record tape, which is driven at constant speed, in accordance with the angular setting imparted to the condenser tuning shaft. While this type of device is entirely satisfactory in operation, it is not adapted for use in conjunction with all makes and types of broadcast receivers. Thus, the connection between the recorder stylus and the receiver tuning shaft dictates the positioning of the recorder in the receiver cabinet, which bars its use in conjunction with small receivers having limited unoccupied cabinet space. The second type of recording device is of the electro-mechanical type in that an electro-mechanical translating system is interposed between the high frequency signal channel of the receiver and the station recording stylus to control the movement of the stylus in its operation to record on a time basis the particular transmitter from which programs are received. Prior art instruments of the second type are principally of the wavemeter type wherein the local oscillator of the receiver is coupled to a sweeping wavemeter through a small coupling capacitor. This coupling capacitor is located directly at the oscillator circuit of the receiver and a shielded or unshielded conductor is used to transmit the local oscillator output signal to the wavemeter. Due to signal attenu-

2 ation over this conductive transmission channel, the coupling conductor must be relatively short, which means that the wavemeter and recording instrument must be located within a few feet of the receiver. Present instruments of the wavemeter type are rather bulky and hence are difficult to conceal or make inconspicuous in the average home. It is possible to use a highly sensitive wavemeter with a long coupling conductor, but there are objections to running such a conductor along the floors or walls of the average home. Further, if the conductor is long, it definitely must be shielded to prevent noise pick-up and to prevent undesired broadcasting of the local oscillator output signal of the receiver. Moreover, the use of a long coupling cable prevents movement of the receiver unless a skilled installation man is available to relocate the receiver. Thus, prior art instruments of the second type are bulky and difficult to make inconspicuous and restrict mobility of the associated receiver. Moreover, one complete and independent instrument is required for each receiver the use of which is to be monitored, thus requiring considerable duplication of equipment in multi-radio collaborator homes.

It is an object of the present invention, therefore, to at least in part obviate the above-mentioned disadvantages of prior art systems and apparatus for recording the transmitting stations to which a wave signal receiver is tuned.

It is another object of the invention to provide improved apparatus and an improved system of the character described which provides for record monitoring of a plurality of receivers with a relatively small amount of apparatus, the majority of which may be located at any desired point distant from the receivers.

It is a still further object of the invention to provide for use in combination with any receiver of the superheterodyne type, exceedingly simple and compact facilities which may be easily installed in the receiver cabinet to transmit to a remote recording point a signal having a variable characteristic uniquely representative of any transmitting station to which the receiver is tuned for program reception.

In accordance with another object of the invention, facilities are provided at the receiver for modulating the station identification signal to provide an indication of the particular receiver at which the signal originates.

It is still another object of the present invention to provide for use at a recording point remote from the receivers, improved and relatively simple apparatus for translating the station identification signals received from a plurality of receivers and for producing a record accurately identifying the transmitting stations to which each monitored receiver is tuned.

The invention both as to its organization and method of operation, together with further objects and advantages thereof, will best be understood by reference to the following specification taken in connection with the accompanying drawings, in which:

Fig. 1 diagrammatically illustrates a system and apparatus characterized by the features of the present invention;

Fig. 2 schematically illustrates a modification of the apparatus which may be combined with the wave signal receiver shown in Fig. 1;

Fig. 5 diagrammatically illustrates a different embodiment of the equipment provided at the recording point to produce a record of the transmitting stations to which each of a plurality of receivers embodied in the system are tuned.

Figure 1:
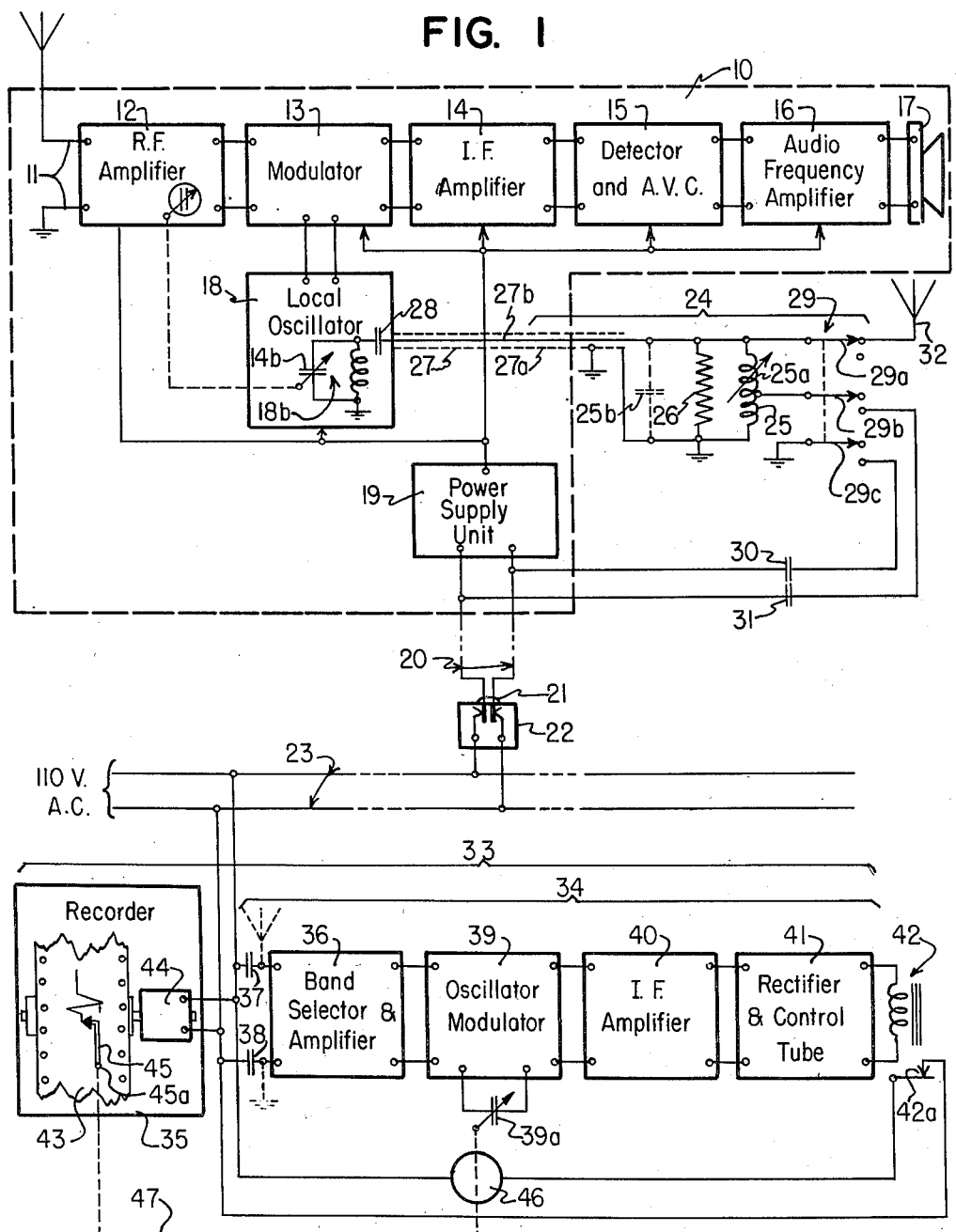

Referring now to the drawings and more particularly to Fig. 1 thereof the present improved system and apparatus is there illustrated in its use to produce a record identifying the transmitting stations to which a wave signal receiver 10 of the conventional broadcast type may be tuned over a given calendar period by users of the receiver in the home of a system collaborator. The receiver 10 is of the well known superheterodyne type and is comprised of an antenna-ground circuit 11, a tunable radio frequency amplifier 12, a mixer or modulator 13, an intermediate frequency amplifier 14, a detector and automatic gain control unit 15, an audio frequency amplifier 16 and a transducer or loudspeaker 17 connected in tandem in the order named. The usual local or beat frequency oscillator 18 is provided at the mixing stage 13 for heterodyning a receiving program signal carrier to a fixed intermediate frequency. To this end, the tuning condenser 14b of the tunable frequency determining circuit 18b provided in the oscillator 18 is arranged to be gang tuned with the selective circuits of the radio frequency amplifier 12. Cathode heat current as well as screen and anode potentials for the electron discharge tubes provided in the identified stages of the receiver 10 are supplied by the usual power supply unit 19 which forms an integral part of the receiver. This power supply unit is adapted to be excited from the usual 110-volt alternating current source 23 over a power supply cord, the conductors 20 of which are illustrated as being plug connected to the source 23 through plug 21 and a socket 22. It will be understood that the conductors 23 forms a part of the current distribution system for the dwelling in which the receiver 10 is installed and that these conductors either extend to or are parallel connected with other conductors located in the different rooms of the dwelling.

In general, the receiver 10 as described above is entirely conventional in arrangement and its mode of operation is well understood in the art. Briefly, however, program modulated signal carriers intercepted by the antenna-ground circuit 11 are selected and amplified in the radio frequency amplifier 12, converted into a modulated carrier of fixed frequency at the mixer or modulator stage 13, further selected and amplified in the intermediate frequency amplifier 14, and detected in the detector and automatic gain control unit 15. The program or modulation components thus developed at the output side of the unit 15 are amplified by the audio frequency amplifier 16 and delivered to the loudspeaker 17 for reproduction. Automatic gain control of one or more of the receiver stages 12, 13 and 14, under the control of the gain control bias developed in the unit 15, is accomplished in an entirely conventional manner. Selection of different desired program modulated signal carriers originating at different transmitting stations is of course accomplished by adjustment of the tuning elements of the radio frequency amplifier 12 and to an even greater extent by adjustment of the tuning condenser 14b of the local oscillator 18 to vary the output frequency of this oscillator. Thus it will be understood that reception of any program carrier from a given wave signal transmitter is represented by a definite output frequency of the local oscillator 18. Accordingly, the output frequency of this oscillator may be used to identify the particular transmitting station to which the receiver 10 is tuned for program reception at any particular time.

Although a single receiver has been described by way of illustration, it will be understood that in actual practice several hundred broadcast receivers located in homes within the radiation areas of different sets of wave signal transmitters broadcasting the particular programs of interest are employed to provide the record information concerning the listening habits of the receiver users necessary to a statistical analysis from which the various factors affecting the sales effectiveness of particular programs may be accurately arrived at. In using the system, it is contemplated that selection of the system collaborator homes, i. e., the homes in which wave signal receiver use is to be logged, shall be on a basis such that all of the variable factors, such, for example, as number of potential listeners, economic affluence, religion, etc., which normally affect any process of sampling public opinion are accounted for on a weighted basis. In the interests of simplifying the disclosure, however, only a single wave signal receiver 10 and associated recording facilities has been illustrated in the drawings.

For the purpose of producing a decodable record accurately and positively identifying all programs received at the respective collaborator receivers used in the sample of homes during any given calendar period, each collaborator receiver is, in accordance with the present invention, provided with a network 24 coupled between the local oscillator 18 and a signal channel extending to a remote recording point, for impressing a signal on the transmission channel having a frequency representative of the output frequency of the local oscillator. In the embodiment of the invention illustrated in Fig. 1 of the drawings, the network is illustrated as being selectively operable to transmit energy extracted directly from the local oscillator tank circuit 18b to the remote recording point at which the translating and recording equipment 33 is located, either by way of a space link comprising a small directional or non-directional radiating antenna 32 provided at the receiver 10, or alternatively by way of a conductive channel which includes the power supply conductors 20 over which current is delivered to the power supply unit 19 of the receiver.

In brief, the network 24 is in the form of a passive impedance matching network and is coupled to the local oscillator tank circuit by means of a small coupling capacitor 28 having a capacitance value of the order of one microfarad and a shielded conductor 27b, the shielding 27a of which is grounded to the receiver chassis. More specifically, the network 24 is comprised of an inductance element 25a which resonates with its own distributed capacitance and the capacitance of a length of shielded cable 27 to form a tuned radio frequency circuit 25. This circuit is suitably damped by means of a shunt damping resistor 26 to provide for substantially uniform signal voltage transmission over a frequency range coincidental with and at least as wide as the range of frequencies over which the local oscillator 18 is tunable. In the usual case the band width is of the order of one or two megacycles for a commercial broadcast receiver having an intermediate frequency of 455 kilocycles. Matching of the tuned circuit 25 to the impedance of the signal channel into which it operates may be accomplished by appropriately tapping the inductance element 25a. In the arrangement shown, the blade 29a of the two-position selector switch 29 which leads to the antenna 32 is preferably tapped to the inductance element 25a at a point thereon several thousand ohms above ground in order to match the impedance of the antenna ground circuit into which the tuned circuit 25 is operating. On the other hand, the switch blade 29b, which is used in combination with the blade 29c to couple the circuit 25 by way of the coupling condensers 30 and 31 to the power supply conductors 20, is connected to the inductance element 25a at a point which is only a few ohms above ground. Preferably, the circuit constants of the network 24 and particularly the tuned circuit 25 are so chosen as to provide for maximum uniform impedance across the shunt capacitance of the circuit at all frequencies within the pass band thereof. The purpose of providing maximum uniform impedance across the shunt capacitance of the circuit is to obtain the greatest possible signal transmission ratio between the voltage across the local oscillator tank circuit 18b and the voltage impressed upon the signal channel utilized in transmitting the local oscillator output signal to the distant recording point.

From the above explanation it will be understood that with the receiver 10 in operation and with the switch 29 in its illustrated setting, the tuned circuit 25 is excited from the local oscillator tank circuit 18b by a signal voltage which has a frequency representative of, i. e., equal to, the output frequency of the local oscillator 18. The signal voltage thus developed across the tuned circuit 25 is impressed between the radiating antenna 32 and ground for radiation to the remotely located translating and recording equipment 33. On the other hand, if the switch 29 occupies its other setting, a portion of the signal voltage developed across the inductance element 25a is impressed directly upon the power supply conductors 20 over a circuit which includes the coupling condensers 30 and 31 and the switch blades 29b and 29c. This voltage is conductively transmitted over the power supply system including the feeder conductors 23 to the remotely located transmitting and recording equipment 33.

As the receiver 10 is tuned to receive program signals from different transmitting stations, the output frequency of the local oscillator 18 is obviously varied to produce a corresponding variation in the frequency of the signal voltage impressed upon the space link transmission channel comprising the antenna 32 or upon the power supply conductors 20 depending upon the position of the switch 29.

Regarding the form of link employed to transmit the signal from the network 24 to the translating and recording equipment 33, it may be stated that when the receiver 10 is operating within the AM band, the conductive channel is generally preferable to the space link for the reason that the conductive channel minimizes radiation of the signal and hence cuts down possible interference with other receivers in the vicinity of the receiver 10 and the additional reason that it minimizes the likelihood of the translating and recording equipment falsely responding to a strong local oscillator output signal from another receiver in the vicinity or a powerful transmitter operating close by on a carrier frequency within the reception range of the signal translating equipment at the recording point. However, if the signals are to be transmitted to a recording point distant from the dwelling in which the receiver is in use, radio frequency by-pass condensers must be used to by-pass the transformers of the current distribution system connecting the dwelling and the recording point. Permission to install such condensers is usually difficult to obtain. Again if the receiver 10 being monitored is of the portable type adapted to be self powered from batteries provided therein, no conductive channel is available for signal transmission to the recording point when the receiver is battery operated. Hence, use of the space link comprising the antenna 32 becomes mandatory. Conveniently, the network 24, switch 29, antenna 32 and coupling condensers 30 and 31 may be manufactured as a kit or package universally applicable to receivers of all types and makes. If desired, the switch 29 may be mechanically connected for actuation by the power supply change over switch (or plug) of a small portable receiver, so that when the receiver is conditioned for energization from a commercial frequency source of alternating current, it is switched to its conductive channel setting and when the receiver is conditioned for battery operation, it is switched to its antenna-ground setting.

At the translating and recording point the variable characteristic of the received signal voltage, i. e., the frequency thereof, is utilized as the stylus governing factor in producing a record identifying the transmitting stations to which the receiver 10 is tuned. The equipment 33 may be of the form disclosed in Patent No. 2,305,834, Woodruff, granted December 22, 1942, although preferably it is of the form disclosed in copending application Serial No. 511,246, filed November 22, 1943, now Patent 2,483,573, and assigned to the same assignee as the present invention. In brief, the equipment 33 provided at the recording point is divided into two principal components, i. e., a translating channel 34 and a recorder 35. The translating channel 34 comprises a band pass selector and amplifier 36 broadly tuned to receive and transmit in amplified form any signal received from the network 24, a mixer or oscillator-modulator 39, an intermediate frequency amplifier 40, a detector and control tube 41 and a control relay 42 connected in tandem in the order named. The input terminals of the amplifier 36 may either be coupled to the power supply conductors 23 through the coupling capacitors 37 and 38 or may be connected to the antenna-ground circuit shown in dash lines, depending upon the type of link employed between the receiver and recording point. The local oscillator section of the oscillator-modulator 39 is tunable by means of a tuning condenser 39a over a band at least as wide as the tuning range of the local oscillator 18 to provide for heterodyning of any received signal to the fixed intermediate frequency which the selective circuits of the amplifier 40 are designed to pass.

Briefly considered, the recorder 35 comprises a recording tape 43 movable between supply and take-up spools, not shown, and driven at a constant speed by a driving sprocket having spaced peripheral teeth engageable with edge perforations in the tape. Constant speed rotation of the driving sprocket is obtained by shaft connecting this sprocket to a synchronous motor and gear train unit 44, the synchronous motor of which is adapted for energization from the current supply conductors 23. The recorder is also equipped with a recording stylus 45 pivotal about an axis 45a to move the inscribing point thereof transversely of the tape 43. Tuning of the oscillator section of the oscillator-modulator 39 is under the control of a sweep motor 46 also adapted for energization from the supply conductors 23 through the contacts 42a of the relay 40. This motor is also connected by means of a linkage, schematically illustrated at 47, to move the stylus back and forth transversely of the record tape 43 as it functions to drive the tuning condenser 39a over its tuning range.

Briefly to consider the mode of operation of the translating and recording equipment 33, it is pointed out that the recorder 35 is maintained in continuous operation and that the translating channel 34 is at all times conditioned for signal translation. So long as a signal representative of the station to which the receiver 10 is tuned is not received at the recording point, the relay 42 is and continues to remain energized to maintain the motor 46 energized in an obvious circuit. With this motor in continuous operation, the condenser 39a is continuously driven to tune the oscillator section of the oscillator-modulator 39 back and forth between the limits of the tuning range and the stylus 35 is concurrently driven back and forth transversely of the recording tape 43. As a consequence, an oscillatory wave is inscribed upon the recording tape 43 to indicate a non-listening interval. When operation of the receiver 10 is initiated and the receiver is tuned to receive program signals from a given transmitting station, a radio frequency signal is transmitted from the oscillator 18 by way of the network 24 and over the space or carrier link to the translating equipment 34. This signal is passed by the selector and amplifier 36 and mixed with the output of the local oscillator section of the oscillator-modulator 39. With the motor 46 still in operation to change the output frequency of this local oscillator, an output frequency is finally obtained which, when heterodyned with the received signal, produces a beat frequency equal to the intermediate frequency capable of being transmitted by the intermediate frequency amplifier 40. This beat frequency signal as amplified through the amplifier 40 is rectified in the unit 41 and impressed between the input electrodes of the control tube in this unit as a negative bias to decrease the energization of the relay 42. As a consequence, this relay releases and opens its contacts 42a to deenergize the sweep motor 46. Thus, tuning of the oscillator section of the oscillator-modulator 39 is arrested and movement of the stylus 45 transversely of the tape 43 is stopped. So long as the signal persists, i. e., so long as the receiver 10 remains tuned to the particular transmitting station from which program signals are being received, the relay 42 remains in its released setting to prevent further operation of the motor 46. Accordingly, a straight line is traced upon the record tape 43 at a position transversely of this tape which is indicative of the particular transmitting station being received by the receiver 10. When this receiver is tuned to another station to change the frequency of the signal being transmitted to the translating channel 34, signal transmission through the intermediate frequency section of this channel is terminated to effect reoperation of the relay 42 and thus reinitiate operation of the sweep motor 46. This motor continues to operate until the new signal frequency is found, at which time the relay 42 releases to again deenergize the motor. Since a change in the setting of the condenser 39a is required to find the new signal frequency, it will be understood that a corresponding change is produced in the setting of the stylus 45 transversely of the tape. Hence the stylus inscribes a straight line upon this tape which is transversely displaced from the first straight line segment and falls in a position transversely of the tape which identifies the particular transmitting station newly selected for reception by the receiver 10.

Since the tape 43 is driven at a constant speed and the starting and stopping times of this tape are known, each straight line segment inscribed thereon not only provides an accurate indication of the time interval during which each transmitting station is received, but also the location of this interval in a particular calendar period. Hence by suitably decoding the tape 43 in a manner well understood in the art, exact information is obtained as to the extent of use of the receiver 10 and the particular transmitting stations received during all listening periods.

Figure 2:
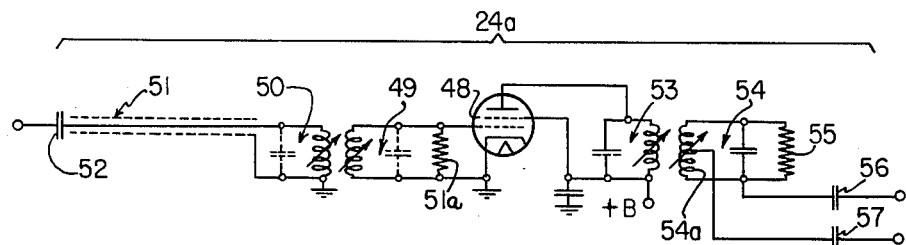

Referring more particularly to Fig. 2 of the drawings, the network 24a there illustrated is adapted to be used in lieu of network 24 in transmitting the local oscillator output signal from the local oscillator of the receiver to the space or conductive link over which the signals are to be relayed to the remote recording point. Generally speaking, this network differs from the network 24 in the provision of one stage of amplification and in the use of double tuned circuits to provide the desired frequency selectivity. Specifically, the network 24a comprises inductively coupled and frequency selective input circuits 49 and 50, the last of which is adapted to be excited from the local oscillator of the receiver over a short length of shielded cable 51 through a small coupling capacitor 52. The tuned circuit 49 is shunted by a damping resistor 51a having the function of flattening out the transmission response of the two intercoupled circuits 49 and 50 to provide for the application of a signal voltage of uniform amplitude between the input electrode of the amplifier tube 48 at all frequencies within the tuning range of the local oscillator 18. The output circuit of the amplifier tube 48 includes a tuned circuit 53 inductively coupled to a secondary tuned circuit 54 which is shunted by a damping resistor 55. Here again, the two intercoupled circuits 53 and 54 are designed to have uniform transmission characteristics at all frequencies within the range of frequencies over which the local oscillator is tunable. Signal transmission from the network 24a to the recording point is accomplished by applying the signal voltage developed across the tapped portion 54a included in the tuned circuit 54 across the power supply conductors 20 of the receiver through the coupling capacitors 56 and 57, thereby to provide for conductive transmission of the signal energy over the power supply system to the distant recording point.

The mode of operation of the network 24a to transmit the local oscillator output signal in amplified form to the power supply conductors 20 will be substantially apparent from the above explanation. Briefly, however, the signal voltage as derived from the local oscillator tank circuit 18b and impressed across the tuned input circuit 50 of the network 24a through the coupling capacitor 52 and the shielded cable 51, is amplified by the tube 48 and delivered through the selective circuits 53 and 54 for application to the supply conductors 20 through the coupling capacitors 56 and 57. When a network 24a of proper design is used, the amplifier tube 48 operating in the manner just described may produce a signal output level as measured across the power supply conductor 20 as much as fifty-five times greater than the level of the signal input voltage appearing across the tuned circuit 49. In general, the broader the frequency band which the network 24a is required to handle, the less the gain which may be realized while maintaining a uniform gain characteristic. Thus in handling the FM band (twenty megacycles wide) a maximum gain of five times the signal input level is about the best that can be obtained. In such case it may be desirable to add additional stages of amplification in the network 24a which are intercoupled through frequency selective circuits of the character described. Aside from the differences just pointed out, the system shown in Fig. 1 of the drawings when modified to include the network 24a instead of the network 24, operates in the exact manner explained above.

Figure 3:
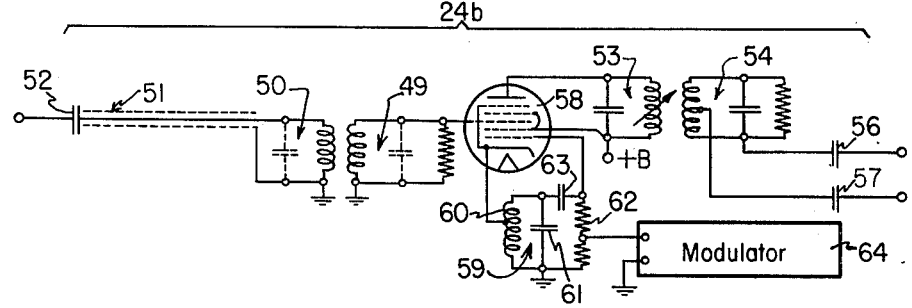
Fig. 3 illustrates a second modification of the apparatus which may be combined with the receiver shown in Fig. 1.

Referring now more particularly to Fig. 3 of the drawings, a network 24b is illustrated which may be used instead of either of the two described networks 24 and 24a to impress a signal representative of the frequency of the local oscillator output signal upon the transmission channel to the recording point, i. e., an antenna-ground circuit or the power supply conductors 20 of the receiver schematically illustrated in Fig. 1 of the drawings. In general, the network 24b differs from the network 24 in the provision of means comprising an oscillator-modulator or mixer tube 58 for converting the local oscillator output signal to a frequency of a different order of magnitude which may be transmitted over the power supply system comprising the conductors 23 to the distant recording point, and further in the provision of means comprising a modulator 64 for amplitude modulating the transmitted signal to identify the particular receiver 10 at which the signal originates. This network has unique advantages in that the frequency band within which the output frequency of the local oscillator 18 appears may be shifted a convenient amount to minimize possible interference with other receivers in the vicinity of the receiver 10. Also, in the handling of high frequency bands, such, for example, as the FM band, the frequency band may be shifted to a lower part of the frequency spectrum to thus permit simplification of the design of the translating equipment provided at the recording point. Further, if a space link channel is to be used in transmitting the signals from the receiver to a central recording point several miles away over a channel assigned by the Federal Communications Commission the frequency conversion or shift may be effected to move the signal into the assigned frequency channel. Regardless of the extent of frequency shift effected through provision of the oscillator modulator stage, it will be understood that the frequency selective input circuits 49 and 50 are designed to pass with uniform level all frequencies within the band over which the local oscillator is tunable. The frequency selective output circuits 53 and 54 are similarly designed to pass a frequency band of equal width without substantial attenuation at any frequency within the band. However, the latter circuits are selective to frequencies within a different band than the band which the input circuits 49 and 50 are designed to pass, by virtue of the shift in frequency effected by mixing the local oscillator output frequency with the output frequency of the oscillator section of the oscillator-modulator 58.

This section of the oscillator-modulator utilizes the cathode and inner control grid of the tube 58 (which is of the well known pentode type) and comprises a fixed tuned tank circuit 59 consisting of an inductance element 60 shunted by a tuning condenser 61 and center tap connected to the cathode of the tube 58. The tank circuit 59 is tuned to a frequency either higher or lower than the center frequency of the band over which the local oscillator 18 is tunable by an amount determined by the degree of frequency conversion or shift desired. It is shunted by a leak resistor 62 through a leak condenser 63, the combination having the function of maintaining an appropriate bias on the inner control grid of the tube 58. Although the described oscillator circuit and the other circuit connections to the tube 58 are substantially conventional, they have been described in some detail to facilitate an understanding of the circuit operation and the manner in which the receiver identifying modulating voltage is introduced into the signal channel. Specifically, the latter function is accomplished by connecting the output terminals of the modulator 64 across a section of the grid leak resistor 62 so that output voltage of the local oscillator section of the tube 58 is amplitude modulated in accordance with the signal developed by the modulator 64. This modulator may be in the form of any well known type of sign wave oscillator either of the electronic or electromechanical type. In its simplest form it may comprise a source of 60 cycle alternating voltage of appropriate amplitude extracted from the power supply conductors 20 through a voltage dropping network.

Briefly to consider the mode of operation of the network 24b, it is pointed out that the local oscillator output signal as impressed across tuning circuit 50 through the coupling capacitor 52 is applied across the signal input electrode of the tube 58 through the selective circuit 49 and is electronically mixed with the output signal continuously generated by the oscillator section of the tube 58. Since the output signal of the oscillator section of the tube 58 is modulated at a predetermined frequency by the modulator 64, the beat frequency components produced through mixing of the two signals within the tube 58 are similarly modulated. Thus, a modulated beat frequency signal having a frequency within the pass band of the frequency selective output circuits 53 and 54 is passed by these circuits and impressed across the power supply conductors 20 of the receiver through the coupling capacitors 56 and 57. As the tuning of the receiver 10 is shifted to effect selection of different program signals for transmission and reproduction in the receiver 10, the carrier frequency of the signal impressed between the power supply conductors 20 through the network 24b is of course correspondingly shifted in a manner clearly apparent from the above explanation to provide an indication of the change in tuning of the receiver 10. However, the modulation component of this signal as developed through operation of the modulator 64 does not change in frequency. In other words, the modulation component is of fixed frequency so that it at all times identifies the origin of the signal at the recording point.

As will be evident from the above description, the purpose of modulating the station identifying signal transmitted from each receiver in a multi-radio home to the recording point is to permit separate identification of the signals at the recording point, such that separate records or record traces may be produced to represent the extent of use of each receiver and the stations listened to at each receiver during any given calendar period. To this end, modulators 64 are provided in the networks 24b combined with the receivers which have different and distinguishable output frequencies. For reasons which will be apparent from the following explanation with reference to Fig. 5 of the drawings, it is desirable to employ different modulator output frequency rates which bear no harmonic relationship to each other, in order to facilitate separation of the modulation components of the different station identification signals and to provide for accurate identification of the receivers at which these signals originate.

Figure 4:
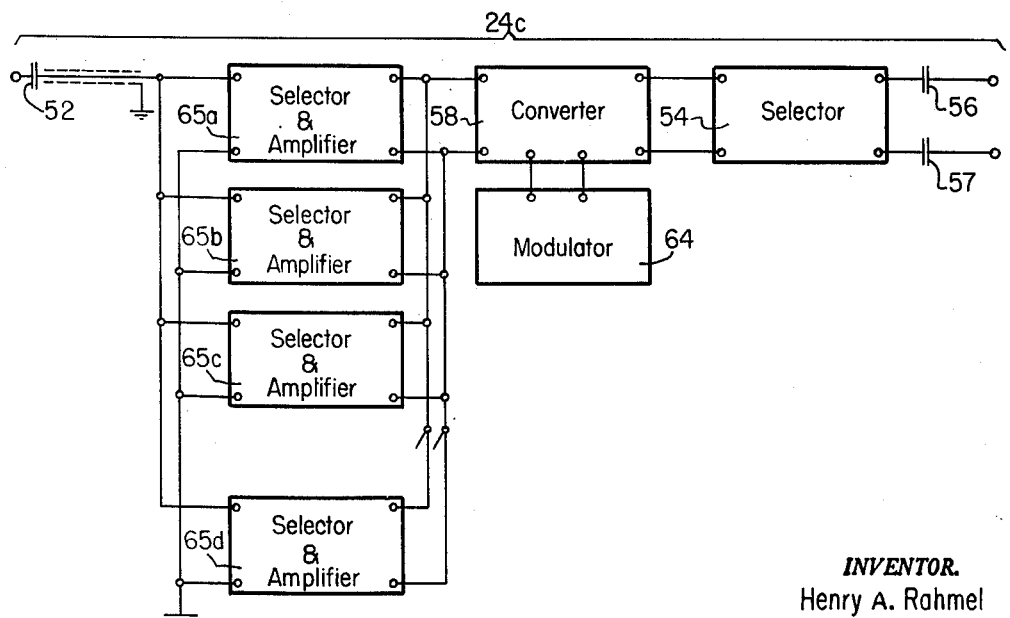
Fig. 4 illustrates a third modification of the apparatus which may be combined with the receiver shown in Fig. 2.

The modified network 24c illustrated in Fig. 4 of the drawings is substantially similar to that just described with reference to Fig. 3 except that the converter 58 is preceded by a plurality of parallel connected selector and amplifier units 65a, 65b, 65c, 65d, etc., through which the energy extracted from the local oscillator of the receiver may be transmitted to the converter 58. Like the networks 24, 24a and 24b, the network 24c may be connected to impress the generated output signal either upon an antenna-ground circuit for space radiation to the distant recording point or upon the conductive channel comprising the power supply conductors 20. The selective circuits of the different units 65a, 65b, 65c, etc., may be designed to pass different but overlapping portions of the frequency range over which the local oscillator of the receiver is tunable, thereby to provide for the handling of an exceedingly wide band of frequencies, such, for example, as the FM band. In other words, the overall band of frequencies over which the local oscillator of the receiver is tunable is broken down into overlapping segments and the selective circuits of the different units 65a, 65b, 65c, etc., are respectively designed to pass signals having frequencies within the different band segments. This means that when the receiver is tuned to receive signals from one transmitting station, the unit 65a, for example, is active to transmit the local oscillator output signal to the converter 58, whereas if the receiver is tuned to receive signals from a different transmitting station, the unit 65b, for example, is activated to transmit he local oscillator signal to the converter 58. Thus, depending upon the particular frequency to which the local oscillator of the receiver is tuned, the units 65a, 65b, 65c, 65d, etc., are selectively used to transmit the signal to the converter 58. If the band to be covered is exceedingly wide, parallel connected selective circuits 54 tuned to different overlapping frequency bands may be required at the output side of the converter 58 to transmit the converted signal as modulated with the receiver idenification signal to the signaling channel connecting the network 24b with the distant recording point.

As an alternative to tuning the selective circuits of the units 65a, 65b, 65c, 65d, etc., to pass different segmental portions of the particular band over which the local oscillator of the receiver is tunable, the selective circuits of these units may be sharply tuned to particular frequencies within the tuning range of the receiver local oscillator, which correspond respectively to particular transmitting stations to which the receiver may be tuned for signal reception. For example, the selective circuits of the units 65a, 65b and 65c may be sharply tuned to pass local oscillator output frequencies corresponding to tuning of the receiver to three different transmitting stations having network affiliations. The selective circuits of the other units may be sharply tuned to pass local oscillator frequencies corresponding to other popular transmitting stations, network or otherwise, within the radius of reception of the receiver. With this latter arrangement, the converter 58 is only activated to produce a signal which may be passed by the selector 54 to the signal channel when the receiver is tuned to receive signals from one of the transmitting stations to which the units 65a, 65b, 65c, 65d, etc., respectively correspond.

In general, the translating and reproducing apparatus illustrated in Fig. 5 of the drawings is of the same character as that shown in Fig. 1 of the drawings and described above. The equipment is, however, modified to include translating means for discriminating on a highly selective basis between the different modulated station signals originating at different receivers, thereby to provide for entirely accurate recording of the stations listened to at the several receivers. More specifically, the high frequency translating channel 34 of the equipment shown in Fig. 5 of the drawings is identical with that shown in Fig. 1 of the drawings, with the exception of the unit 41. In this unit a simple diode detector 41a and associated load resistor 41b is substituted for the rectifier and control tube employed at the same stage of the channel 34 used in Fig. 1 system. The signal modulation detector thus provided is adapted to transmit the detected modulation components of any received station identification signal successively and in a predetermined order through a commutating device 68 to a plurality of low frequency translating channels 70a, 70b and 70c of identical circuit arrangement. The commutating device 68 comprises conductive segments 68a, 68b and 68c adapted to be successively engaged by a wiper 68d which is continuously driven about a rotary axis 68e by means of a synchronous motor and gear train unit 69. The synchronous motor of this unit is connected for continuous energization from the current supply conductors 23 over a pair of supply conductors 69a. With the motor of the unit 69 continuously energized, the wiper 68d of the commutating device 68 is continuously driven successively to connect the load or ouput resistor 41b of the detector 41 to the input terminals of the translating channels 70a, 70b and 70c for intervals of equal duration, the length of which is determined by the speed of rotation of the wiper 68d.

As indicated above, the three low frequency translating channels are of identical circuit arrangement. In brief, the translating channel 70a is comprised of an amplifier tube 71a, a diode rectifier tube 73a, a control tube 75a and a control relay 76a connected in tandem in the order named. A frequency selective circuit 72a is provided in the output circuit of the amplifier tube 71a which is sharply tuned to resonance at the particular modulation frequency at which the station identifying station signal originating at a particular receiver (the receiver 10 in the case under consideration) is modulated. For example, if the output frequency of the modulator 64 is sixty cycles per second, the circuit 72a will be sharply tuned to this same frequency so that it will pass signals of this frequency and reject signals of all other frequencies. The voltage developed across the circuit 72a when this circuit is excited at its natural resonant frequency is impressed across the diode rectifier 73a through a coupling capacitor in an entirely conventional manner. This rectifier is shunted by a load resistor 74a and is so poled that the direct voltage developed across the resistor 74a during signal transmission through the channel 70a is negatively applied to the control grid of the control tube 75a. More specifically, the voltage developed across the load resistor 74a is impressed between the input electrodes of the control tube 75a over a path which includes a filter resistor 80a. The series combination of resistors 74a and 80a is shunted by a condenser 81a having the effect of smoothing the bias voltage developed during signal detection by the rectifier 73a. Normally, the control tube 75a is self-biased by means of a cathode resistor 82a only to an extent which will permit the normally operated relay 76a to be released when a rectified signal voltage is developed across the resistor 74a. Thus the relay 76a is normally maintained operated. This relay is provided with a pair of contacts 78a which are chain connected with corresponding contacts carried by the relays 76b and 76c of the translating channels 70b and 70c and are serially included in the circuit for energizing the sweep motor 46. With this arrangement, the motor 46 is deenergized when any one of the relays 76a, 76b and 76c is released in response to signal translation in the associated translating channel.

In the illustrated embodiment of the translating and recording equipment, the recorder 35 is equipped with one stylus for each of the translating channels 70a, 70b and 70c. These styli 45a, 45b and 45c serving the three translating channels are spaced apart transversely of the recording tape 43 and are pivotal about their respective supporting axis to move the recording points thereof back and forth transversely of the tape 43 within the borders of different recording tracks extending longitudinally of the tape. They are normally spring biased to settings wherein the recording points are disengaged from the record trace 43 and are adapted to bring the recording points into engagement with the tape 43 by means of magnets 83a, 83b and 83c, respectively. Further, they are gang connected by means of a suitable mechanical linkage for pivotal movement back and forth transversely of the record tape 43 in response to operation of the sweep motor 46 to drive the tuning condenser 39a embodied in the local oscillator section of the oscillator-modulator 39. Aside from the provision of a plurality of styli, the recorder 35 may be of the exact form described above with reference to Fig. 1 of the drawings.

In order to prevent the sweep motor 46 from operating during those intervals when none of the receivers being monitored is in operation, a rectifier and control tube unit 84 is provided which is coupled directly to the output terminals of the band selector and amplifier unit 36 and is arranged to control a relay 85 having contacts 85a serially included in the circuit for energizing the motor 46. With this arrangement, the rectifier and control tube unit 84 holds the relay 85 operated during periods of concurrent nonuse of the several receivers, such that the energizing circuit for the motor 46 is held open at the contacts 85a.

Briefly to consider the mode of operation of the translating and recording equipment just described with reference to Fig. 5 of the drawings, it is pointed out that when a modulated station identification signal is transmitted from the network 24b or the network 24c associated with the local oscillator of the receiver 10, for example, over the current supply conductors 23 to the input terminals of the channel 34, it is amplified through the unit 36 and impressed upon the input terminals of the rectifier and control tube unit 84. This unit responds to the signal voltage by decreasing the energization of the relay 85 sufficiently to cause this relay to release and close its contacts 85a, thereby to complete the operating circuit for the sweep motor 46 through chain connected contacts 78a, 78b and 78c. Thus operation of the sweep motor is initiated to drive the styli 45a, 45b and 45c transversely of the tape 43 and to drive the tuning condenser 39a. When this condenser is operated to the setting required to effect signal transmission through the intermediate frequency amplifier 40, i. e., to the particular setting representative of the carrier frequency of the receiver signal which in turn is representative of the station to which the receiver 10 is tuned, a signal voltage of the particular frequency identifying the receiver 10 is developed across the diode rectifier 41a and associated load resistor 41b. This voltage is impressed between wiper 68d of the commutator and ground through the coupling capacitor 41c. Depending upon the position occupied by this wiper, the described modulation voltage is impressed upon the input terminals of one of the three translating channels 70a, 70b and 70c. For reasons explained above, if the wiper is in engagement with either of the conductive segments 68b or 68c, the signal voltage is rejected by the selective circuit of the corresponding channels 70b, 70c to prevent the release of the relays 76b and 76c respectively provided at the ends of these channels. On the other hand, if or when the wiper 68d engages the conductive segment 68a, the detected modulation components of the received signal are impressed between the input terminals of the translating channel 70a, amplified by the tube 71a, passed by the tuned selective circuit 72a and impressed across the load resistor 74a and the diode rectifier 73a in parallel.

through the coupling capacitor 79a. This voltage as rectified by the diode rectifier 73a appears across the load resistor 74a and is impressed between the input electrodes of the control tube 75a through the filter resistor 80a. It has the effect of increasing the negative bias upon the control grid of the control tube 75a sufficiently to effect the release of the relay 76a, whereupon this relay immediately opens its contacts 78a to interrupt the operating circuit for the sweep motor 46 and thus stop this motor, the condenser 39a and the styli 45a, 45b and 45c in the particular settings thereof which correspond to the carrier frequency of the received signal and hence the transmitting station to which the receiver 10 is tuned. At its contact 77a, the relay 76a closes an obvious circuit for energizing the magnet 83a. This magnet now attracts the stylus 45a to bring the marking point thereof into engagement with the tape 43 so that a straight line is inscribed upon the record tape 43 in the recording track assigned to the stylus 45a at a position between the borders of this track representative of the particular transmitting station being received by the receiver 10. So long as the wiper 68 remains in engagement with the conductive segment 68a, the translating and recording equipment will continue to monitor the receiver 10 to the exclusion of the other two receivers for the reason that the selective circuit 72a of the channel 70a continues to reject the receiver identification modulation components of the station identification signal originating at the other two receivers. Should, however, the tuning of the receiver 10 be changed during the period when the wiper 68d remains in engagement with the conductive segment 68a, the intermediate frequency amplifier will cut off signal transmission to the detector 41 with the result that the relay 76a is reoperated to reinitiate operation of the motor 46. This motor now resumes its hunting operation until the new signal frequency is located, when signal transmission through the intermediate frequency amplifier 40 is resumed to effect the release of the relay 76a.

When the wiper 68d is advanced to engage the conductive segment 68b and thus couple the input terminals of the channel 70b to the output terminals of the detector 41, the equipment is conditioned to record signals originating only at the second receiver. In this case, the relay 76b controls energization of the sweep motor 46 through its contacts 78b and controls the stylus magnet 83b through its contacts 77b so that when the signal originating at the second receiver is found, the motor 46 is stopped and the stylus 45b is operated to produce a record of receiver station choice in the second recording track along the tape 43. The manner in which this is accomplished will be readily apparent from the foregoing explanation.

Again, when the wiper 68d is advanced to engage the conductive segment 68c, the input terminals of the third low frequency translating channel 70c are coupled to the output terminals of the detector 41 to condition the translating and recording equipment to monitor the third receiver to the exclusion of the first and second receivers. In this case, the relay 76c is controlled through the low frequency translating channel 70c to effect deenergization of the sweep motor 46 at the contacts 78c when the signal originating at the third receiver is found, and to energize the stylus magnet 83c through its contacts 77c to effect station choice recording in the third recording track along the tape 43. It will thus be apparent that as the motor and gear train unit 79 continuously rotate the wiper 68d, the three receivers which may be forwarding signals to the equipment shown in Fig. 5 of the drawings are sequentially monitored for like time intervals of equal length. Should any one or two of the three receivers not be in use concurrently with use of the other receiver or receivers, no one of the three stylus magnets 83a, 83b and 83c will be energized during the monitoring period allotted to the inactive receiver or receivers. Non-use of one or two of the three receivers as distinguished from non-use of all receivers will, however, be readily apparent upon inspection of the tape 43 from the fact that no record marks are produced on the tape at recurrent segments by one or two of the three styli 45a, 45b and 45c. In this regard it will be understood that since the band selector and amplifier unit 36 is designed with a pass characteristic embracing the carrier frequencies of all signals which may be received from any and all of the three receivers, the relay 85 remains in its released position continuously so long as any one of the receivers is in operation. Thus continuous record monitoring of the three receivers is obtained so long as one thereof is in use.

From the preceding explanation, it will be understood that the present invention completely obviates the difficulties inherent in prior art instruments of the character referred to in the introductory portion of the specification. Thus regardless of which of the three networks 24, 24a and 24b is employed in combination with each collaborator receiver of the system, it is so simple and small that the components thereof when assembled may readily be incorporated in the cabinet of the smallest portable receivers. Further, any one of the networks may be installed by relatively unskilled personnnel without in any way adversely affecting the performance of the receiver in which it is installed. Moreover, the character of the recording equipment is such that it may be located in any out-of-the-way closet or in the basement of the dwelling in which receiver monitoring is to be performed and if desired may be permanently wired to the current distribution system in the dwelling in order to preclude the possibility of inadvertent interruption of the operation of this equipment. It is also possible by use of a space link or links operated at F. C. C. assigned frequencies to locate the recording equipment entirely remote from the collaborator home. In addition, the translating and recording equipment illustrated in Fig. 5 of the drawings when used in combination with networks 24b or 24c of the character shown in Figs. 3 and 4 of the drawings at the collaborator receivers provides a complete and adequate solution to the problem of monitoring two or more receivers in multi-receiver homes.

While different embodiments of the invention have been described, it will be understood that various modifications may be made therein which are within the true spirit and scope of the invention as defined in the appended claims.

I claim:

1. In combination with a radio receiver of the superheterodyne type provided with a local oscillator and power supply conductors for delivering current to the energy consuming components of the receiver, a network coupled between said local oscillator and said power supply conductors for excitation from said local oscillator and including signal translating apparatus coupled to said power supply conductors to impress a signal having a radio frequency representative of the output frequency of said local oscillator upon said power supply conductors, and a modulator for modulating said signal to provide an indication of the receiver at which the signal originates.

2. In combination with a radio receiver of the superheterodyne type provided with a local oscillator and power supply conductors for delivering current to the energy consuming components of the receiver, a network coupled between said local oscillator and said power supply conductors for excitation from said local oscillator and including a frequency converter for converting the variable frequency signal derived from said local oscillator to a variable frequency signal of different radio frequency from that of said local oscillator, and coupling means for impressing said signal of different radio frequency upon said power supply conductors.

3. In combination with a radio receiver of the superheterodyne type provided with a local oscillator and power supply conductors for delivering current to the energy consuming components of the receiver, a network coupled between said local oscillator and said power supply conductors for excitation from said local oscillator and including a frequency converter for converting a signal derived from said local oscillator to a signal of different radio frequency, coupling means for impressing said signal of different radio frequency upon said power supply conductors, and a modulator for modulating said signal of different radio frequency to provide an indication of the receiver at which the signal originates.

4. In combination with a radio receiver of the superheterodyne type provided with a local oscillator tunable over a band of frequencies to select different signal modulated carriers for reception, a signal transmission link for transmitting signals from said receiver to a recording point, a band pass network having a signal pass range at least as wide as said band, a frequency converter excited by a signal derived from said oscillator through said network for converting the signal derived from said local oscillator to a signal of different radio frequency, and a second band pass network having a signal pass range at least as wide as said band for transmitting said signal of different radio frequency to said signal transmission link.

5. In combination with a radio receiver of the superheterodyne type provided with a local oscillator tunable over a band of frequencies to select different signal modulated carriers for reception, a signal transmission link for transmitting signals from said receiver to a recording point, a band pass network having a signal pass range at least as wide as said band, a frequency converter excited by a signal derived from said local oscillator through said network for converting the signal derived from said local oscillator to a signal of different radio frequency, means for modulating said signal of different radio frequency to provide an indication of the receiver at which the signal originates, and a second band pass network having a signal pass range at least as wide as said band for transmitting said modulated signal of different radio frequency to said signal transmission link.

6. In combination with a radio receiver of the superheterodyne type provided with a local oscillator tunable over a band of frequencies to select different signal modulated carriers for reception, a signal transmission link for transmitting signals from said receiver to a recording point, a band pass network having a signal pass range at least as wide as said band, an oscillator-modulator excited by a signal derived from said local oscillator through said network for converting the signal derived from said local oscillator to a signal of different radio frequency, a modulating signal source coupled to the oscillator section of said oscillator-modulator to modulate said signal of different radio frequency with a signal having a frequency indicative of the receiver at which the signal originates, and a second band pass network having a signal pass range at least as wide as said band for transmitting said modulated signal of different radio frequency to said signal transmission link.

7. In combination with a radio receiver of the superheterodyne type provided with power supply conductors for delivering current to the energy consuming components of the receiver and a local oscillator tunable over a band of frequencies to select different signal modulated carriers for reception, a band pass network having a signal pass range at least as wide as said band, an oscillator-modulator excited by a signal derived from said local oscillator through said network for converting the signal derived from said local oscillator to a signal of different radio frequency, a modulating signal source coupled to the oscillator section of said oscillator-modulator to modulate said signal of different radio frequency with a signal having a frequency indicative of the receiver at which the signal originates, and means including a second band pass network having a signal pass range at least as wide as said band for impressing said modulated signal of different radio frequency upon said power supply conductors.

8. A system for recording the transmitting stations to which each of a plurality of wave signal receivers is tuned, comprising signal generators individual to said receivers and responsive to the tuning of said receivers for developing signals having different fixed characteristics respectively identifying the different receivers and other characteristics of said signals variable with the tuning of the receivers to identify the transmitting stations to which the receivers are respectively tuned, and means selectively responsive to both the fixed and variable characteristics of said signals for producing indications identifying the transmitting stations to which each receiver is tuned.

9. A system for recording the transmitting stations to which each of a plurality of wave signal receivers is tuned, comprising means individual to said receivers for developing signals having different fixed characteristics respectively identifying the different receivers and other characteristics of said signals variable with the tuning of the receivers to identify the transmitting stations to which the receivers are respectively tuned, recording means, translating means selectively responsive to both the fixed and variable characteristics of any received one of said signals for causing said recording means to produce a record identifying the transmitting station to which the receiver identified by the translated signal is tuned, and means for causing said translating means to translate said signals sequentially in a predetermined order.

10. A system for recording the transmitting stations to which each of a plurality of wave signal receivers is tuned, comprising means individual to said receivers and responsive to the tuning of said receivers for developing modulated signals having signal frequencies representative of the transmitting stations to which said receivers are respectively tuned and different modulation components respectively representative of the different receivers, and means selectively responsive to both the signal frequency and the modulation components of said signals for producing a record identifying the transmitting stations to which each of said receivers is tuned.

11. A system for recording the transmitting stations to which each of a plurality of wave signal receivers is tuned, comprising means individual to said receivers and responsive to the tuning of said receivers for developing modulated signals having signal frequencies representative of the transmitting stations to which said receivers are respectively tuned and different modulation components respectively representative of the different receivers, recording means, translating means selectively responsive to both the signal frequency and the modulation components of any received one of said signals for causing said recording means to produce a record identifying the transmitting station to which the receiver identified by the translated signal is tuned, and means for causing said translating means to translate said signals sequentially in a predetermined order.

12. A system for recording the transmitting stations to which each of a plurality of wave signal receivers is tuned, comprising means individual to said receivers and responsive to the tuning of said receivers for developing modulated signals having signal frequencies representative of the transmitting stations to which said receivers are respectively tuned and different modulation components respectively representative of the different receivers, receiving means including a signal translating channel provided with a detector for detecting the modulation components of any received one of said signals, recording means, and means coupled to said detector and selectively responsive to said different modulation components for causing said recording means to produce a record identifying the transmitting stations to which each of said receivers is tuned.

13. A system for recording the transmitting stations to which each of a plurality of wave signal receivers is tuned, comprising means individual to said receivers and responsive to the tuning of said receivers for developing modulated signals having signal frequencies representative of the transmitting stations to which said receivers are respectively tuned and different modulation components respectively representative of the different receivers, receiving means including a signal translating channel provided with a detector for detecting the modulation components of any received one of said signals, recording means, separate translating means selectively responsive to the detected modulation components of different ones of said signals for causing said recording means to produce a record identifying the transmitting stations to which each of said receivers is tuned, and means for coupling said translating means to said detector in a predetermined order.

14. A system for recording the transmitting stations to which each of a plurality of wave signal receivers is tuned, comprising means individual to the receivers and responsive to the tuning of said receivers for developing modulated signals having signal frequencies representative of the transmitting stations to which said receivers are respectively tuned and fixed frequency modulation components of different frequencies respectively representative of the different receivers, receiving means including a signal selective translating channel tunable to receive any one of said signals and provided with a detector for detecting the modulation components of any selected one of said signals, recording means, and means coupled to said detector and selectively responsive to the detected modulation components of different fixed frequency for selectively tuning said translating channel to receive different ones of said signals and for causing said recording means to produce a record identifying the transmitting stations to which each of said receivers is tuned.

15. A system for recording the transmitting stations to which each of a plurality of wave signal receivers is tuned, comprising means individual to the receivers and responsive to the tuning of said receivers for developing modulated signals having signal frequencies representative of the transmitting stations to which said receivers are respectively tuned and fixed frequency modulation components of different frequencies respectively representative of the different receivers, receiving means including a signal selective translating channel tunable to receive any one of said signals and provided with a detector for detecting the modulation components of any selected one of said signals, recording means, separate translating means selectively responsive to the detected modulation components of different fixed frequency, means for sequentially coupling said translating means ot said detector in a predetermined order, and means selectively controlled by said translating means for tuning said translating channel to receive different ones of said signals and for causing said recording means to produce a record identifying the transmitting stations to which each of said receivers is tuned.

16. In a system for recording the transmitting stations to which each of a plurality of wave signal receivers is tuned, recording means, receiving means including a signal selective translating channel tunable to receive any one of a plurality of modulated signals each having a fixed frequency modulation component representative of a particular one of said receivers and a signal frequency which varies with the tuning of the particular receiver to identify the transmitting station to which the particular receiver is tuned, said translating channel being provided with a detector for detecting the modulation components of any selected one of said signals, means for tuning said translating channel to receive different ones of said signals, and means coupled to said detector and selectively responsive to the detected modulation components of different fixed frequencies for controlling said tuning means to selectively tune said translating channel to receive different ones of said signals and for causing said recording means to produce a record identifying the transmitting stations to which each of said receivers is tuned.

17. In a system for recording the transmitting stations to which each of a plurality of wave signal receivers is tuned, recording means, receiving means including a signal selective translating channel tunable to receive any one of a plurality of modulated signals each having a fixed frequency modulation component representative of a particular one of said receivers and a signal frequency which varies with the tuning of the particular receiver to identify the transmitting station to which the particular receiver is tuned, said translating channel being provided with a detector for detecting the modulation components of any selected one of said signals, separate translating means selectively responsive to the detected modulation components of different fixed frequency, means for sequentially coupling said translating means to said detector in a predetermined order, and means selectively controlled by said translating means for tuning said translating channel to receive different ones of said signals and for causing said recording means to produce a record identifying the transmitting stations to which each of said receivers is tuned.

HENRY A. RAHMEL.

REFERENCES CITED

The following references are of record in the file of this patent:

UNITED STATES PATENTS

| Number | Name | Date |
|---|---|---|
| 1,990,489 | Hopkins | Feb. 12, 1935 |
| 2,096,109 | Hopkins | Oct. 19, 1937 |
| 2,188,165 | Thomas | Jan. 23, 1940 |
| 2,202,452 | Hildabrand | May 28, 1940 |
| 2,213,886 | Potter | Sept. 3, 1940 |
| 2,249,324 | Potter | July 15, 1941 |
| 2,342,167 | Potter | Feb. 21, 1944 |
| 2,344,562 | Potter | Mar. 21, 1944 |
| 2,369,662 | Deloraine et al. | Feb. 20, 1945 |
| 2,466,804 | Giffen et al. | Apr. 12, 1949 |
| 2,483,573 | Clark, Jr. | Oct. 4, 1949 |